(12) United States Patent
Ishida

(10) Patent No.: US 12,015,161 B2
(45) Date of Patent: Jun. 18, 2024

(54) CATALYST FOR SOLID POLYMER FUEL CELL AND METHOD FOR SELECTING CATALYST FOR SOLID POLYMER FUEL CELL

(71) Applicant: TANAKA KIKINZOKU KOGYO K.K., Tokyo (JP)

(72) Inventor: Minoru Ishida, Hiratsuka (JP)

(73) Assignee: TANAKA KIKINZOKU KOGYO K.K., Tokyo (JP)

(*) Notice: Subject to any disclaimer, the term of this patent is extended or adjusted under 35 U.S.C. 154(b) by 662 days.

(21) Appl. No.: 17/269,891

(22) PCT Filed: Aug. 15, 2019

(86) PCT No.: PCT/JP2019/032067
§ 371 (c)(1),
(2) Date: Feb. 19, 2021

(87) PCT Pub. No.: WO2020/040040
PCT Pub. Date: Feb. 27, 2020

(65) Prior Publication Data
US 2021/0328230 A1    Oct. 21, 2021

(30) Foreign Application Priority Data
Aug. 22, 2018   (JP) .................. 2018-155107

(51) Int. Cl.
  *H01M 4/92*        (2006.01)
  *G01N 23/2273*   (2018.01)
  *H01M 8/10*        (2016.01)
(52) U.S. Cl.
  CPC ........ *H01M 4/926* (2013.01); *G01N 23/2273* (2013.01); *H01M 4/921* (2013.01); *H01M 2008/1095* (2013.01)

(58) Field of Classification Search
None
See application file for complete search history.

(56) References Cited

U.S. PATENT DOCUMENTS

2007/0254206 A1* 11/2007 Gillan ................. H01M 4/9075
                                                                         429/510
2015/0125783 A1    5/2015 Ishida et al.
(Continued)

FOREIGN PATENT DOCUMENTS

CN      1098606242    *   6/2019
EP      2 650 956 A1    10/2013
(Continued)

OTHER PUBLICATIONS

Ball et al. (J. Power Sources 171 (2007) 18-25) (Year: 2007).*
(Continued)

*Primary Examiner* — Lisa S Park
(74) *Attorney, Agent, or Firm* — Foley & Lardner LLP

(57) ABSTRACT

The present invention relates to a catalyst for solid polymer fuel cells in which catalyst particles containing Pt as an essential catalyst metal are supported on a carbon powder carrier. The catalyst has good initial activity and good durability. When the catalyst is analyzed by X-ray photoelectron spectroscopy after potential holding at 1.2 V (vs. RHE) for 10 minutes in a perchloric acid solution, a ratio of zero-valent Pt to total Pt is 75% or more and 95% or less. The present inventive catalyst metal is preferably one obtained by alloying Pt with one of Co, Ni and Fe, and further with one of Mn, Ti, Zr and Sn. In addition, it is preferable that a fluorine compound having a C—F bond is (Continued)

supported on at least the surfaces of catalyst particles in an amount of 3 to 20 mass % based on the total mass of the catalyst.

13 Claims, 1 Drawing Sheet

(56) References Cited

U.S. PATENT DOCUMENTS

| | | | |
|---|---|---|---|
| 2016/0013495 A1* | 1/2016 | Ishida | H01M 4/8842 429/524 |
| 2017/0149069 A1 | 5/2017 | Ishida et al. | |
| 2017/0200956 A1 | 7/2017 | Nagami et al. | |
| 2019/0221858 A1 | 7/2019 | Hashimoto et al. | |
| 2020/0036014 A1 | 1/2020 | Ishida et al. | |
| 2020/0052309 A1 | 2/2020 | Kaieda et al. | |

FOREIGN PATENT DOCUMENTS

| | | |
|---|---|---|
| EP | 2 953 195 A1 | 12/2015 |
| EP | 3 591 751 A1 | 1/2020 |
| EP | 3 614 472 A1 | 2/2020 |
| JP | 2010-027364 A | 2/2010 |
| JP | 5152942 B1 | 2/2013 |
| JP | 6053223 B2 | 12/2016 |
| WO | WO-2014/126077 A1 | 8/2014 |
| WO | WO-2016/021399 A1 | 2/2016 |
| WO | WO-2018/070149 A1 | 4/2018 |
| WO | WO-2018/194007 A1 | 10/2018 |
| WO | WO-2018/194008 A1 | 10/2018 |
| WO | WO-2018/194009 A1 | 10/2018 |
| WO | WO-2019/065443 A1 | 4/2019 |

OTHER PUBLICATIONS

Grasset et al. (Materials Research Bulletin, vol. 34, Nos. 12/13, pp. 2010-2108, 1999) (Year: 1999).*
https://www.technologyreview.com/2010/05/05/203948/a-better-platinum-catalyst-for-fuel-cells/ (Year: 2010).*
Antolini, et al., "The methanol oxidation reaction on platinum alloys with the first row transition metals", Applied Catalysis B: Environmental 63: 137-149 (2006).
European Extended Search Report, dated Sep. 16, 2021, issued in corresponding European Patent Application No. 19852572.7, (10 pages).
Office Action issued in corresponding European Patent Application No. 19852572.7, dated May 31, 2023.
International Searching Authority, "International Search Report," in connection with International Patent Application No. PCT/JP2019/032067, dated Nov. 19, 2019.
International Searching Authority, "Written Opinion," in connection with International Patent Application No. PCT/JP2019/032067, dated Nov. 19, 2019.
Huang et al., "Electrocatalytic Performance of Highly Loaded PtNi Intermetallic Nanoparticles for Oxygen Reduction", Chemical Journal of Chinese Universities, vol. 36, No. 10, Oct. 2015, pp. 1961-1968.
Office Action issued in corresponding Chinese Patent Application No. 201980054299.X dated Nov. 28, 2023 (19 pages).
Office Action issued in corresponding Korean Patent Application No. 10-2023-7034718 dated Jan. 23, 2024 (10 pages).

* cited by examiner

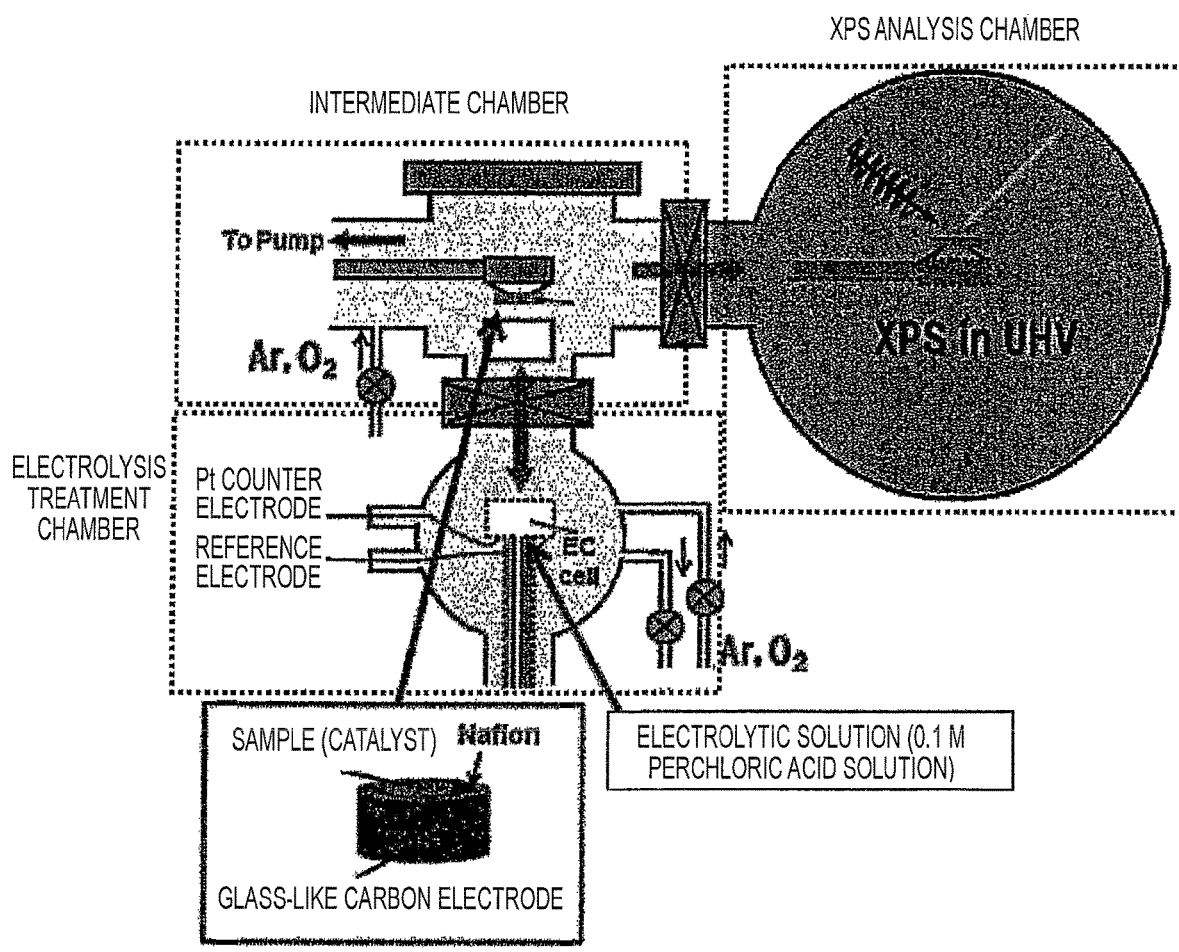

CATALYST FOR SOLID POLYMER FUEL CELL AND METHOD FOR SELECTING CATALYST FOR SOLID POLYMER FUEL CELL

RELATED APPLICATIONS

The present application claims priority under 37 U.S.C. § 371 to International Patent Application No. PCT/JP2019/032067, filed Aug. 15, 2019, which claims priority to and the benefit of Japanese Patent Application No. 2018-155107, filed on Aug. 22, 2018. The contents of these applications are hereby incorporated by reference in their entireties.

TECHNICAL FIELD

The present invention relates to a catalyst for solid polymer fuel cells. Particularly, the present invention relates to a catalyst which is suitably used in cathodes (air electrodes) for solid polymer fuel cells.

BACKGROUND ART

Practical realization of fuel cells once termed as next-generation power generation systems have come to be realistic, and at present, popularization of fuel cells should be promoted. Fuel cells are classified into several types, and in particular, solid polymer fuel cells have the advantage of operating at a low temperature and having a small size. Due to such an advantage, solid polymer fuel cells are considered as promising automobile power sources and domestic power sources. A solid polymer fuel cell has a layered structure in which a solid polymer electrolyte membrane is sandwiched between a hydrogen electrode (anode) and an air electrode (cathode). A fuel including hydrogen and oxygen or air are supplied to the hydrogen electrode and the air electrode, respectively, and power is generated by means of oxidation and reduction reactions taking place at the electrodes. In addition, a mixture of a solid electrolyte and a catalyst for accelerating electrochemical reaction is generally applied for both the electrodes.

As catalysts for forming electrodes for fuel cells, platinum catalysts (Pt catalysts) have been heretofore widely used in which a precious metal, particularly platinum (Pt), is supported as a catalyst metal. This is because Pt as a catalyst metal has high activity in acceleration of electrode reaction at both a fuel electrode and a hydrogen electrode. There have been an increasing number of cases where an alloy catalyst in which an alloy having Pt and another transition metal is supported for reducing the catalyst cost by reducing the use amount of Pt or improving catalytic activity. For example, a Pt—Co catalyst having catalyst particles of an alloy of Pt and cobalt (Co) is known as a catalyst which can exhibit activity higher than that of a Pt catalyst while allowing the use amount of Pt to be reduced (Patent Document 1). Further, a ternary alloy catalyst has been reported in which platinum is alloyed with not only cobalt but also another transition metal such as manganese by the present applicant for further improving the Pt—Co catalyst (Patent Document 2).

For studies on properties of a catalyst for solid polymer fuel cells, those aimed at improvement of catalytic activity (initial activity) are mainstream, and recently, there have been an increasing number of cases of studies for high initial activity and also, improvement of durability. Catalysts cannot be prevented from undergoing reduction of activity (deactivation) which occurs with elapse of time. Hence, enhancement of durability of catalysts, and prolongation of time until deactivation may be essential for practical realization and popularization of fuel cells.

As an approach to improvement of durability of a catalyst for solid polymer fuel cells, the present applicant has disclosed a catalyst having a water-repellent layer with a predetermined fluorine compound supported on the catalyst (Patent Document 3) with regards to the alloy catalyst (Patent Document 2). In this catalyst, water generated through fuel cell reaction is rapidly discharged by water-repellent layer, so that water-mediated dissolution of a catalyst metal is suppressed to secure durability.

RELATED ART DOCUMENTS

Patent Documents

Patent Document 1: JP 2010-27364 A
Patent Document 3: JP 5152942 B2
Patent Document 2: JP 6053223 B2

SUMMARY OF THE INVENTION

Problems to be Solved by the Invention

In view of recent situations in which fuel cells have been realistically popularized, it is evident that further studies are required although there is no limitation on demand for improvement of the properties of catalysts for solid polymer fuel cells. The problem of durability is hardly solved by the above-described conventional arts, and a catalyst with high durability is desired.

The present invention has been made against the backdrop of the above-described situations, and an object of the present invention is to provide a catalyst for solid polymer fuel cells in which Pt is used as an essential catalyst metal, the catalyst having further improved durability while maintaining initial activity.

Means for Solving the Problems

For achieving the above-described object, the present inventor conducted studies on improvement of durability in terms of, for example, improvement of a method for manufacturing a Pt catalyst or a Pt alloy catalyst which is a conventional catalyst for solid polymer fuel cells (Patent Documents 1 to 3). In the process of the studies, attention was given to a relationship between a predetermined dynamic property and durability. The predetermined dynamic property is a surface state of catalyst particles after a catalyst is held at a specific potential (polarization) in an electrolytic solution, specifically a ratio of Pt (atomic Pt) with 0-valent (zero-valent) to total Pt present on the surfaces of catalyst particles.

Studies by the present inventor have shown that even catalysts having catalyst particles of the same composition may have a difference in durability depending on methods for manufacturing the catalysts. For example, it has been confirmed that catalysts including water-repellent layers for securing durability like the catalyst of Patent Document 3 and having fluorine compound (water-repellent layer) added in the same amount to catalyst metals (Pt—Co—Mn etc.) of the same composition have particularly excellent durability as the case may be. Studies by the present inventor have shown that a catalyst having particularly excellent durability has the above-described dynamic property within a predetermined range.

On the basis of the results of the studies, the present inventor found a catalyst for solid polymer fuel cells, which contains Pt as an essential catalyst metal and which is capable of solving the above-described problems, and as a result, the present inventor has arrived at the present invention.

That is, the present invention provides a catalyst for solid polymer fuel cells in which catalyst particles containing Pt as an essential catalyst metal are supported on a carbon powder carrier. When the catalyst for solid polymer fuel cells is analyzed by X-ray photoelectron spectroscopy after potential holding at 1.2 V (vs. RHE) for 10 minutes in a perchloric acid solution, a ratio of zero-valent Pt to total Pt as measured by the analysis is 75% or more and 95% or less.

As described above, the catalyst for solid polymer fuel cells is identified by a surface state of catalyst particles when potential holding is performed at a specific potential (1.2 V (vs. RHE)) in a specific electrolytic solution (perchloric acid solution). The catalyst particles in the catalyst of the present invention have Pt as an essential catalyst metal, and other compositions (type of catalyst metal) and existence or non-existence of additional constituents such as a water-repellent layer are not limited, and are the same as in conventional catalysts. Hereinafter, the catalyst for solid polymer fuel cells according to the present invention will be described in detail beginning with conditions for identification of the catalyst.

(A) Dynamic Characteristics of Catalyst for Solid Polymer Fuel Cells of the Invention The catalyst according to the present invention is defined by a surface state of catalyst particles after potential holding at 1.2 V (vs. RHE) for 10 minutes in a perchloric acid solution. The surface state of the catalyst particles can be identified by X-ray photoelectron spectroscopic analysis, and the result of the analysis, a ratio of zero-valent Pt to total Pt was determined.

Catalyst particles in the catalyst during driving of a solid polymer fuel cell are affected by oxidation resulting from fuel battery reaction. The oxidation of catalyst particles may lead to a decrease in activity of the catalyst. The component (metal) contributing to catalytic activity of the catalyst is mainly Pt. Therefore, it can be said that the durability of the catalyst is strongly associated with the state of Pt on the surfaces of catalyst particles. The present inventor has found that the catalyst held at a potential of 1.2 V (vs. RHE) in a perchloric acid solution is a catalyst in which the ratio of zero-valent Pt to total Pt on the surfaces of catalyst particles is 75% or more, durability can be further improved. While the reason for this is difficult to clarify, the present inventor considers that even catalyst particles comparable to those of conventional arts in composition and existence or non-existence of a water-repellent layer etc. may undergo some structural change (e.g. a change in arrangement of Pt atoms or bonding state between Pt and an alloy atom, a structural change of water-repellent layer of a fluorine compound or the like), which is unidentifiable by known methods and detected under the above-described potential holding condition.

The ratio of zero-valent Pt on the surfaces of catalyst particles after potential holding at 1.2 V (vs. RHE) in a perchloric acid solution is determined to be 75% or more on the basis of the results of examination by the present inventor. This is because the present inventor has found that a catalyst in which the ratio of zero-valent Pt on the surfaces of catalyst particles after potential holding is 75% or more has higher durability over conventional arts. The ratio of zero-valent Pt is more preferably 80% or more. The upper limit of the ratio of zero-valent Pt is ideally 100%, and is preferably 95% in practice.

Here, as a state of Pt on the surfaces of catalyst particles after potential holding of the catalyst for solid polymer fuel cells in a perchloric acid solution, not only zero-valent metallic Pt but also divalent Pt($Pt^{2+}$) and tetravalent Pt($Pt^{4+}$) are observed. In addition, as a result of adsorption of oxygen (O) or hydroxides (OH), Pt different in an electronic state from metallic Pt is observed. When the catalyst is held at a high potential, Pt on the surfaces of catalyst particles may undergo a state change of "zero-valent Pt (atomic Pt)→absorption of O or OH→divalent Pt→tetravalent Pt". The stage at which Pt turns into tetravalent Pt($Pt^{4+}$) may correspond to a degraded state of the catalyst. Therefore, it can be said that a catalyst with a low ratio of tetravalent Pt on the surfaces of catalyst particles of the catalyst after potential holding performed under the above-described conditions is preferable. Specifically, the ratio of tetravalent Pt to total Pt as measured through the potential holding and analysis is 1.5% or less. A catalyst in which the tetravalent Pt is more than 1.5% may have durability equal to or less than that in the conventional arts when used practically as a fuel cell electrode.

In the present invention, the state of the surfaces of catalyst particles after potential holding under the above-described conditions is defined, the state of the catalyst immediately after and before potential holding is not particularly limited. That is, the ratio of zero-valent Pt on catalyst particles is not required to be 75% or more in the catalyst immediately after production and before potential holding performed under the above-described conditions. However, since the treatment of potential holding at 1.2 V (vs. RHE) in the perchloric acid solution is treatment for oxidizing catalyst particles, and the ratio of zero-valent Pt in the potential holding treatment does not increase, the ratio of zero-valent Pt is preferably high in the state immediately after and before potential holding. Specifically, the ratio of zero-valent Pt is 75% or more, more preferably 90% or more.

The ratio of Pt in each of various states (zero-valent Pt and tetravalent Pt) on the surfaces of catalyst particles is determined by X-ray photoelectron spectroscopic analysis (XPS). XPS is means capable of qualitatively and quantitatively analyzing the state of the polar surface of a substance. Pt in each of various states of the surfaces of catalyst particles can be analyzed. The specific method for measuring the ratio of zero-valent Pt on the surfaces of catalyst particles by XPS is preferably based on a Pt4f spectrum measured from the catalyst. Here, since the waveform of the resulting spectrum is a mixed waveform of spectra derived from Pt in the states of zero-valent Pt, divalent Pt and tetravalent Pt, the waveforms of the measured spectra are separated on the basis of peak positions corresponding to the states, individual peak areas are calculated, and the ratio of zero-valent Pt atoms to the total Pt is calculated based on the ratio of the peak areas. In XPS analysis, the Pt4f spectrum can be measured over a range from 67 eV to 87 eV. By setting peak positions at 71.6 eV (zero-valent Pt), 72.2 eV (Pt in a state of adsorbing O and OH), 74.0 eV (divalent Pt) and 75.2 eV (tetravalent Pt) in the separation of waveforms, a ratio of zero-valent Pt (peak area ratio) can be obtained.

(B) Composition of Catalyst Particles of the Present Inventive Catalyst for Solid Polymer Fuel Cells The catalyst for solid polymer fuel cells of the present invention has a characteristic in a surface state after potential holding under the predetermined condition, and use of Pt as an essential constituent metal of the catalyst particles is the only compositional and constitutional essential condition. The reason why Pt is used as an essential catalyst metal is that Pt has high activity, particularly high initial activity. As catalyst particles of the present inventive catalyst for the solid polymer fuel cell, not only particles formed of Pt, but also particles formed of a Pt alloy obtained by alloying Pt with another metal are used.

Examples of catalyst particles formed of a Pt alloy include a binary Pt alloys containing Pt as a catalyst metal and metal M1, with Pt being alloyed with metal M1 which is one of Co, Ni and Fe. By forming these metals into an alloy, a catalyst having high activity can be obtained while the use amount of Pt as a catalyst metal is reduced. The binary Pt alloy is preferably a Pt—Co alloy catalyst, a Pt—Ni alloy catalyst or the like.

A ternary or higher-nary Pt alloy obtained by alloying Pt with metal M1 and further with metal M2 is also preferable as catalyst metal. Here, as metal M2, at least one of Ni, Fe, Mn, Ti, Zr and Sn is formed into an alloy. Metal M2 is a metal different from metal M1. Examples of the alloy catalyst include Pt—Co—Mn alloy catalysts, Pt—Co—Zr alloy catalysts and Pt—Co—Ni alloy catalysts.

When catalyst particles formed of a Pt alloy are used, a conventional art composition can be applied as an alloy composition. For example, it is preferable that the composition of the Pt—Co alloy catalyst as a binary alloy is preferably Pt:Co=1:0.14 to 0.67 in terms of a molar ratio. The composition of the Pt—Co—Mn alloy catalyst as a ternary alloy is preferably Pt:Co:Mn=1:0.25 to 0.28:0.07 to 0.10, more preferably Pt:Co:Mn=1:0.26 to 0.27:0.08 to 0.09, in terms of a molar ratio. The composition of the Pt—Co—Zr alloy as a ternary alloy catalyst is preferably Pt:Co:Zr=3: 0.5 to 1.5:0.1 to 3.0, more preferably Pt:Co:Zr=3:0.5 to 1.5:0.2 to 1.8, in terms of a molar ratio. These ternary alloy catalysts are catalysts with Mn and Zr added to a Pt—Co catalyst to exhibit higher initial activity over a Pt—Co catalyst. However, addition of an excessive amount of Mn and Co rather causes a decrease in activity, and therefore the above-described range is a proper range.

(C) Other Configurations of Catalyst for Solid Polymer Fuel Cells of the Invention (C-1) Water-Repellent Layer The catalyst of the present invention may include an additional structure such as a water-repellent layer as disclosed in the conventional arts described above. In particular, a water-repellent layer formed of fluorine compound having a C—F bond as disclosed in Patent Document 3 is a configuration suitable for improving the durability of the catalyst.

As factors of causing a decrease in activity of the catalyst over time, several phenomena such as coarsening of catalyst particles are known, and one of the phenomena is degradation by elution of metals forming catalyst particles (Pt, metal M1 such as Co, and metal M2 such as Mn). The mechanism of the degradation is disappearance of the catalyst metal due to electrochemical dissolution of metals which is mediated by water generated fuel cell reaction on the cathode side.

A fluorine compound having high bonding force of a C—F bond is known to have high stability and specific properties such as water-repellency. The water-repellent layer formed of a fluorine compound rapidly discharges generated water from the surfaces of catalyst particles, and suppressed water-mediated dissolution of the catalyst metal to prevent a decrease in activity, so that improvement of durability can be expected.

Examples of the fluorine compound forming the water-repellent layer include fluororesins as water-repellent polymer materials, and fluorine-based surfactants. Examples of the fluorine compound include polytetrafluoroethylene (PTFE) known as Teflon (registered trademark), tetrafluoroethylene-perfluoroalkylvinyl ether copolymers (PFA), tetrafluoroethylene-hexafluoropropylene copolymers (FEP), tetrafluoroethylene-ethylene copolymers (ETFE), polyvinylidene fluoride (PVDF), polychlorotrifluoroethylene (PCTFE), perfluorosulfonic acid-based polymers known as Nafion (registered trademark), and perfluoroacrylic acid esters known as acrylate fluoride. As the fluorine-based surfactant, perfluorobuatnesulfonate group (PFBS)-based surfactant is also effective.

In the present invention, the supporting amount of the fluorine compound forming the water-repellent layer is 3 to 20 mass % based on the total mass of the catalyst. The above-described effect is not exhibited when the supporting amount of the fluorine compound is less than 3 mass %, and there exists the risk of failing to exhibit a catalyst-specific function of accelerating electrode reaction when the supporting amount of the fluorine compound exceeds 20 mass %. The supporting amount of the fluorine compound is more preferably 8 to 20 mass %, still more preferably 8 to 11 mass %. The water-repellent layer is not required to be formed on the entire surface for all catalyst particles, and may be formed on a partial basis. While water-repellent layer may be formed only on catalyst particles, catalyst activity is not affected even when a fluorine compound is supported on a carrier.

The water-repellent layer formed of the above-described fluorine compound is useful for Pt alloy catalysts, and particularly useful for Pt—Co—Mn alloy catalysts and Pt—Co—Zr alloy catalysts which are ternary alloys. This is because the problem of elution of catalyst metals easily occurs. However, the relevant catalyst is not limited to these ternary alloy catalysts. In the present invention, of course, even a catalyst having a water-repellent layer formed of a fluorine compound needs to meet the requirement that the ratio of zero-valent Pt of catalyst particles after potential holding at 1.2 V in a perchloric acid solution be 75% or more. Thus, even catalysts containing the same amount of fluorine compounds and having the same composition may vary in durability depending on whether the above-mentioned requirement is met or not. The cause of the variation may be that some structural difference occurs between catalysts, that cannot be conceived from the results of analysis of the composition, the fluorine compound and the like due to a difference in catalyst metal supporting step and treatment step of forming a water-repellent layer.

(C-2) Average Particle Size of Catalyst Particles

The particle size of the catalyst particle of the catalyst of the present invention is preferably 2 to 10 nm in terms of an average particle size. When the average particle size is less than 2 nm, long-time activity sustainability cannot be reliably obtained, and when the average particle size is more than 10 nm, the catalyst cannot exhibit sufficient initial activity.

The average particle size of catalyst particles can be obtained by, for example, measuring the particle sizes of a plurality of catalyst particles on the basis of images from electron microscope observation such as TEM, and calculating an average. The particles sizes of observation images can be measured by image analysis in addition to visual observation. Preferably, the average particle size of randomly selected 100 or more catalyst particles is measured.

(C-3) Carbon Fine Powder Carrier and Supporting Density

It is preferable that as the carbon powder as a carrier, carbon powder having a specific surface area of 250 m²/g to 1200 m²/g is applied. When the specific surface area is 250 m²/g or more, the area over which the catalyst deposited can be increased, so that catalyst particles can be dispersed at a high level to increase the effective surface area, and when the specific surface area is more than 1200 m²/g, the abundance ratio of ultrafine pores (having a pore size of less than about 20 Å) which an ion-exchange resin hardly enter in formation of an electrode increases, so that the utilization efficiency of the catalyst particles is reduced.

In addition, the supporting density of catalyst particles in the catalyst according to the present invention is preferably 30% to 70% in consideration of the performance of an electrode for a solid polymer fuel cell. The supporting density here is a ratio of the mass of catalyst particles supported on a carrier (the total mass of supported platinum and transition metals M1 and M2) to the mass of the entire catalyst.

(D) Method for Manufacturing Catalyst for Solid Polymer Fuel Cells of the Invention A method for manufacturing a catalyst for solid polymer fuel cells according to the present invention will now be described. The catalyst according to the present invention is configured such that catalyst particles formed of Pt or a Pt alloy (Pt-M1 alloy or Pt-M1-M2 alloy) are supported on a carbon fine powder carrier. Here, a Pt catalyst can be manufactured by appropriately supporting Pt on the carbon fine powder carrier, and performing post-treatment such as heat treatment as appropriate. On the other hand, a Pt alloy catalyst is manufactured in the following manner: the Pt catalyst manufactured as described above is provided as a precursor, metals (M1 and M2) to be alloyed are supported on the precursor, and heat treatment is performed. Thus, the method for manufacturing a catalyst of the present invention is built on a step of manufacturing a Pt catalyst, which is combined with a step of supporting metals (M1 and M2) for forming a Pt alloy catalyst and a post-treatment step for heat treatment, formation of a water-repellent layer and the like. Hereinafter, these steps will be described in detail.

(D-1) Method for Manufacturing Pt Catalyst (D-1-1) Method for Supporting Pt

The method for manufacturing a Pt catalyst is based on a common liquid phase reduction method as a basic step. In the liquid-phase reduction method, a mixed solution is prepared by mixing a carbon powder carrier with a Pt compound solution, a reducing agent is added to the mixed solution to reduce and precipitate Pt, and the Pt is supported on the carbon powder carrier to manufacture a Pt catalyst. In the present invention, for obtaining a Pt catalyst having good durability, a Pt compound solution is added while a carbon powder carrier is pulverized in a step of manufacturing a mixed solution of the carrier and the Pt compound solution.

The Pt compound solution serving as a raw material for Pt which is a catalyst metal is preferably a dinitrodiammine Pt nitric acid solution, a chloroplatinate aqueous solution, a potassium chloroplatinate aqueous solution or a hexaammine Pt hydroxide solution. Since water is used as a solvent, the above-mentioned Pt complexes which are stable in an aqueous solution are preferable. Carbon powder serving as a carrier is mixed with the Pt compound solution, and as described above, in the present invention, the operation of mixing a Pt compound solution with carbon powder while pulverizing the carbon powder is essential. The mixing step is for supporting Pt ions of the Pt compound solution on a carrier, and dictates Pt ion dispersibility and a supporting state. The present inventor points out that by pulverizing the carrier in the mixing step, the dispersion state of Pt ions can be optimized.

As conditions for pulverizing treatment, the pulverizing treatment is preferably performed with the Pt compound solution concentration adjusted so that the ratio of the weight of the carbon powder to the weight of the Pt compound solution is 1:75 to 1:1000. When the amount of water is less than 75 g based on 1 g of the carbon powder, the viscosity of the mixed solution may increase, resulting in occurrence of irregular reaction in subsequent reduction treatment. When the amount of water is more than 1000 g, the concentration of Pt in the mixed solution is so low that the reduction reaction is difficult to occur.

The pulverizing device in the pulverizing treatment is not particularly limited, and a colloid mill, a planetary ball mill or the like can be applied. The time during which the mixed solution is subjected to pulverizing is preferably 3 minutes or more and 60 minutes or less.

A reducing agent is added to the mixed solution of a Pt compound solution and a carrier after pulverizing treatment. The reducing agent is preferably an alcohol (methanol, ethanol or the like). A so-called denatured alcohol obtained by mixing a small amount of methanol with ethanol can also be used. Preferably, the reducing agent is added in an amount of 4 mol or more and 280 mol or less based on 1 mol of Pt in the mixed solution, and at a concentration of 1% by volume or more and 60% by volume or less to the mixed solution.

As reflux (reduction) conditions after addition of the reducing agent, it is preferable that the temperature of the mixed solution is not lower than 60° C. and not higher than the boiling temperature, and the reduction time is 3 hours or more and 6 hours or less. Pt particles are supported on the carrier by the reduction treatment.

(D-1-2) Heat Treatment of Pt Catalyst

The Pt catalyst after the reduction treatment can be used as a precursor for manufacturing a Pt alloy catalyst. For forming the Pt catalyst in this state into the present inventive catalyst for solid polymer fuel cells, predetermined heat treatment is required.

The heat treatment is treatment for forming a Pt catalyst having good durability by adjusting the surface state of catalyst particles (Pt particles) brought into an appropriate dispersed state by supporting step with a pulverizing treatment in the manner described above. The heat treatment temperature is set to a relatively high temperature of 800° C. or higher and 1200° C. or lower in terms of a heating temperature. When the heat treatment temperature is lower than 800° C., a catalyst having durability can be hardly obtained. Heat treatment at 1200° C. or higher may cause a decrease in initial activity due to coarsening of catalyst particles.

The heat treatment is performed preferably in a non-oxidizing atmosphere such as a reducing gas atmosphere or an inert-gas atmosphere, especially preferably in a reducing-gas atmosphere. Specifically, a hydrogen gas atmosphere (containing 50% or more of hydrogen gas) is preferable. The heat treatment time is preferably 3 minutes or more and 3 hours or less. By performing the heat treatment at such a high temperature, a catalyst for solid polymer fuel cells according to the present invention, which has Pt particles as catalyst particles, is manufactured.

(D-2) Method for Manufacturing Pt Alloy Catalyst (D-2-1) Method for Supporting M1 and M2

A Pt alloy catalyst with a Pt alloy (Pt-M1 alloy or Pt-M1-M2 alloy) as catalyst particles can be manufactured by supporting metals M1 and M2 on the Pt catalyst manufactured in the manner described above, and performing heat treatment for forming an alloy. Here, a common liquid-phase reduction method can be applied for supporting metals M1 and M2. That is, metal salt solutions of metals M1 and M2 are brought into contact with the Pt catalyst, and reduction treatment is performed to precipitate M1 and M2 in a metallic state in the vicinity of Pt particles.

As the metal salt solution of metals M1 and M2, aqueous solutions of chlorides, nitrates, acetates and sulfates of metals can be used. For example, when metal M1 is Co, cobalt chloride hexahydrate, cobalt nitrate, cobalt acetate tetrahydrate and the like can be used as metal salt solutions of Co. When metal M2 is Mn, manganese chloride tetrahydrate, manganese nitrate hexahydrate, manganese acetate tetrahydrate and the like can be used as metal salt solutions of Mn. When two or more metals of metal M1 and metal M2 are supported on the Pt catalyst, the order of bringing the metal salt solution into contact with the Pt catalyst is not particularly limited. The metal salt solutions of M1 and M2 may be sequentially brought into contact with the Pt catalyst, or a mixed solution of the metal salt solution of M1 and M2 may be prepared, and brought into contact with the Pt catalyst.

The supporting amount of metals M1 and M2 corresponds to the composition (molar ratio) of the Pt alloy as catalyst particles. Thus, in the supporting step, the composition of catalyst particles can be adjusted by setting the concentration and the amount of the metal salt solution of metals M1 and M2 with consideration given to the supporting amount of Pt in the Pt catalyst. When treatment is performed with an oxidizing solution as described later, metals M1 and M2 may be supported in a relatively large amount which is about 1.5 to 5 times over the set composition (composition ratio) of catalyst particles.

(D-2-2) Heat Treatment to Form M1 and M2 into Alloy

After metals M1 and M2 are supported on the Pt catalyst, drying is performed if necessary, and heat treatment is then performed to alloy Pt and metals M1 and M2. The heat treatment temperature is 700 to 1200° C. In heat treatment at a temperature of lower than 700° C., formation of an alloy between metals is insufficient, and a catalyst having poor activity is obtained. Heat treatment at a temperature of higher than 1200° C. may coarsen catalyst particles, and is difficult to perform in terms of equipment. Therefore, the upper limit of the heat treatment temperature is 1200° C. The heat treatment is performed preferably in a non-oxidizing atmosphere, particularly preferably in a reducing atmosphere (hydrogen gas atmosphere or the like). The heat treatment time is preferably 30 minutes or more and 5 hours or less.

(D-3) Post-Treatment after Formation of Catalyst Particles

The present inventive catalyst manufactured in the manner described above can be subjected to additional/complementary treatment for improving catalyst properties such as durability and initial activity. Specific examples of the treatment include treatment with a fluorine compound for formation of a water-repellent layer, and treatment with an oxidizing solution. In particular, formation of a water-repellent layer has the action of increasing the ratio of zero-valent Pt on the surfaces of catalyst particles after potential holding under the above-described conditions, and has a catalyst durability improving effect.

(D-3-1) Treatment for Forming Water-Repellent Layer (Water Repellency Imparting Treatment)

The water-repellent layer is formed on a catalyst formed into catalyst particles by the heat treatment described above. The water repellency imparting treatment is treatment in which a catalyst is immersed in a fluoro-compound solution, and the solvent is volatilized and evaporated with the fluorine compound supported on the catalyst. The fluoro-compound solution used here is a solution with the fluorine compound dissolved in a solvent. The solvent is a liquid capable of dissolving a fluorine compound, and may be a fluorine-based solvent, or a non-fluorine-based solvent.

In a preferred step of the water repellency imparting treatment, first, a catalyst is immersed and mixed in a solvent to prepare a dispersion liquid, and the dispersion liquid is stirred at room temperature to mix the catalyst compatible and the solvent. The amount of the solvent here is preferably 10 mL or more and 100 mL or less per 1 g of the catalyst. For sufficiently mixing the catalyst and the solvent, the dispersion liquid stirring time is preferably 10 minutes or more and 3 hours or less. The fluoro-compound solution is added dropwise to the dispersion liquid. The content of the fluorine compound in the fluoro-compound solution added dropwise here is equal to the target amount of the fluorine compound supported on the catalyst. The amount of the solvent in the fluoro-compound solution added dropwise here is preferably 10 mL or more and 100 mL or less per 1 g of the catalyst. In the step of the water repellency imparting treatment above, first, a solvent free of a fluorine compound and the catalyst are brought into contact with each other and mixed with each other, and the purpose for this is to support a fluorine compound on the surfaces of catalysts in a suitable state during subsequent dropwise addition of the fluoro-compound solution. In this respect, even when first, a fluoro-compound solution is prepared, and the catalyst is immersed and mixed in the solution, the fluorine compound can be supported. In this case, however, optimization of a supported state of the fluorine compound cannot be achieved.

A mixed liquid of the catalyst and the fluoro-compound solution manufactured in the manner described above is stirred while being heated, so that the solvent is removed to support the fluorine compound on the catalyst. The heating temperature here is 30° C. or higher and 150° C. or lower, and is set according to the type of a solvent. For exhibiting a suitable supported state of the fluorine compound, the heating temperature is more preferably 40° C. or higher and 90° C. or lower. The stirring time is 30 minutes or more and 3 hours or less. Stirring may be performed until the solvent is substantially removed, and after stirring is performed at the above-described temperature for the above-described time, stirring may be completed in a state in which the solvent remains. After stirring, heating may be performed at 40° C. or higher and 150° C. or lower with a drier etc. for completely removing the solvent.

(D-3-2) Oxidizing Solution Treatment

As additional treatment on the catalyst, the catalyst may be brought into contact with an oxidizing solution at least once. In a solid polymer fuel cell, protons produced on the surface of a catalyst are transferred through water and an electrolyte to generate power. Thus, it is preferable that the catalyst for solid polymer fuel cells has a certain level of hydrophilicity (wettability) from the viewpoint of catalytic activity. By bringing the Pt catalyst of the present invention into contact with an oxidizing solution, hydrophilic groups (hydroxyl groups, lactone groups, carboxyl groups and the like) are bonded to the surface of the carrier of the catalyst to impart hydrophilicity, so that initial activity can be enhanced. The oxidizing solution has the action of eluting a part of metals M1 and M2 to catalyst particles formed of a Pt alloy. Thus, it is also possible to adjust the supporting amount of metals M1 and M2 by treatment with the oxidizing solution.

The oxidizing solution used in this treatment is preferably a solution of sulfuric acid, nitric acid, phosphorous acid, potassium permagnesium, hydrogen peroxide, hydrochloric acid, chloric acid, hypochlorous acid, chromic acid or the like. The concentration of such an oxidizing solution is preferably 0.1 to 1 mol/L, and immersing the catalyst in the solution is preferable.

As conditions for treatment with an oxidizing solution, the contact time is preferably 1 to 30 hours, more preferably 2 hours or more. The treatment temperature is preferably 40 to 110° C., more preferably 60° C. or higher. The oxidizing solution treatment may be performed by bringing the catalyst into contact with the oxidizing solution not only once but also two or more times repeatedly. When a plurality of acid treatments is performed, the type of solution may be changed for each treatment.

Preferred timing for performing the oxidizing solution treatment is after catalyst metals (Pt, M1 and M2) are supported and heat treated. Preferably, the catalyst to be treated with the fluorine compound is subjected to oxidizing solution treatment before the fluorine compound treatment. The oxidizing solution treatment may be performed two or more times, or only once.

By performing the post-treatment described above, the present inventive catalyst can be manufactured.

(E) Method for Selecting Catalyst for Solid Polymer Fuel Cells of the Invention

As described above, the present inventive catalyst is defined by a surface state of catalyst particles after potential holding at 1.2 V (vs. RHE) in a perchloric acid solution. The ratio of zero-valent Pt to total Pt on the surfaces of catalysts after the potential holding treatment is measured to determine whether or not the catalyst is the catalyst of the present invention. When the ratio of zero-valent Pt to total Pt is 75% or more and 95% or less, it is determined that the catalyst is the catalyst of the present invention. This determination process has an aspect as a method for selecting a catalyst for solid polymer fuel cells having good durability. That is, for any catalyst for solid polymer fuel cells, a suitable catalyst can be selected by using this selection method.

This selection method includes potential holding treatment of the catalyst, analysis treatment with XPS, analysis of analysis results, calculation of zero-valent Pt, and determination of whether the ratio meets a criterion value.

The potential holding treatment of the catalyst is treatment in which potential holding is performed at 1.2 V (vs. RHE) for 10 minutes in a perchloric acid solution. The concentration of the perchloric acid solution is preferably 0.1 mol/L. The electrolytic solution is preferably one degassed with an inert gas such as argon, nitrogen or the like in advance. For the counter electrode during potential holding treatment, a Pt electrode can be used. The reference electrode is preferably Ag/AgCl. Since the catalyst is in the form of powder, it is preferable to adjust the catalyst to a sample form for potential holding treatment and analysis. This sample can be prepared by, for example, dispersing a catalyst in a solid electrolyte solution such as Nafion (registered trademark), and applying and fixing the resulting dispersion to an electrode such as glass carbon electrode.

For the potential holding of the catalyst sample in the perchloric acid solution, a voltage may be quickly applied to 1.2 V (vs. RHE) from a natural electrode potential, or may be applied to 1.2 V (vs. RHE) after the sample is held at several potentials of 1.2 V (vs. RHE) or lower in a step-by-step manner. In any case, it is necessary to hold the sample at a potential of 1.2 V (vs. RHE) for 10 minutes. After potential holding at 1.2 V (vs. RHE) for 10 minutes, current feeding is quickly blocked, and XPS analysis is performed.

It is absolutely necessary that the catalyst be prevented from contacting oxygen until XPS analysis after potential holding of the catalyst. Therefore, it is preferable that an electrochemical control apparatus for the catalyst and an analysis chamber (chamber) of an XPS analysis apparatus communicate each other in a vacuum state. A specific example of the electrolytic-XPS analysis apparatus will be described later. XPS analysis can be performed by a normal analysis method (use method) under normal analysis conditions for the analysis apparatus.

Analysis of the results of XPS analysis is preferably based on a Pt4f spectrum as described above. The resulting spectrum is subjected to waveform separation by a known method with the use of software as appropriate. The spectrum is subjected to waveform separation into the states of zero-valent Pt, divalent Pt and tetravalent Pt, individual peak areas are calculated, and the ratio of zero-valent Pt atoms to total Pt is calculated based on the peak areas. Whether the ratio of zero-valent Pt atoms to total Pt meets a criterion value: 75% is determined. If the ratio of zero-valent Pt atoms of a catalyst to be selected is less than 75%, the catalyst may be poor in durability when used as an electrode for a solid polymer fuel cell.

The method for selecting a catalyst for solid polymer fuel cells according to the present invention includes evaluating durability without actually incorporating a target catalyst in a fuel cell. This method is a convenient and low-cost selection method.

Advantageous Effects of the Invention

As described above, the present invention relates to a catalyst for solid polymer fuel cells in which conventional Pt-containing catalyst particles are supported, and the catalyst has particularly excellent durability.

BRIEF DESCRIPTION OF THE DRAWINGS

The FIGURE is a diagram illustrating a configuration of a compounding apparatus for electrolysis treatment/XPS analysis, which is used in an embodiment.

DESCRIPTION OF EMBODIMENTS

Hereinafter, a preferred embodiment of the present invention will be described. In this embodiment, three catalysts: a Pt catalyst, a Pt—Co alloy catalyst and a Pt—Co—Mn alloy catalyst were manufactured as catalysts for solid polymer fuel cells, and dynamic characteristics and catalytic properties were measured and evaluated.

Example 1 (Pt Catalyst)

[Manufacturing of Pt Catalyst]

996.42 mL of a dinitrodiammine Pt nitric acid solution (Pt content: 50.00 g) and 3793 mL of pure water were put into a manufacturing vessel. 50.00 g of carbon fine powder (specific surface area: 800 $m^2$/g, trade name: KB) to be used as a carrier was added while being ground. Thereafter, 540 mL (10.8 vol %) of a denatured alcohol (95% ethanol+5% methanol) as a reducing agent was added and mixed. The mixed solution was refluxed and reacted at about 95° C. for 6 hours to reduce the Pt. Thereafter, filtration, drying (60° C. for 15 hours) and washing were performed.

[Heat Treatment]

The Pt catalyst was subjected to heat treatment. The heat treatment was performed in a 100% hydrogen gas at a heat treatment temperature of 1050° C. for 2 hours. A Pt catalyst as Example 1 was obtained by the heat treatment. The supporting density of the platinum catalyst was 52%. The average particle size of catalyst particles was 4.2 nm.

Example 2 (Pt—Co Alloy Catalyst)

A Pt—Co alloy catalyst was manufactured by having Co supported on the Pt catalyst as a precursor before heat treatment, which had been obtained in the step of manufacturing a Pt catalyst in Example 1, to alloy the Pt catalyst into an alloy.

[Supporting of Co]

The Pt catalyst as a precursor was immersed in a metal salt solution obtained by dissolving 1.6 g of cobalt chloride ($CoCl_2 \cdot 6H_2O$) in 100 mL of ion-exchange water, and was stirred with a magnetic stirrer. To this solution was added dropwise 500 mL of a sodium borohydride (SBH) solution having a concentration of 1% by mass, the mixture was stirred, and subjected to reduction treatment, and Co was supported on the Pt catalyst. Thereafter, filtration, washing and drying were performed.

[Alloy Formation Heat Treatment]

The Pt catalyst in which Co was supported was subjected to heat treatment for alloy formation. This heat treatment was performed in 100% hydrogen gas at a heat treatment temperature of 1000° C. for 30 minutes.

[Treatment with Oxidizing Solution]

The catalyst after the heat treatment was treated with an oxidizing solution. In this treatment, the catalyst after heat treatment was immersed in a 0.2 mol/L sulfuric acid aqueous solution at 80° C. for 2 hours, and then filtered, washed and dried. Thereafter, the catalyst was immersed in a 1.0 mol/L nitric acid aqueous solution (dissolved oxygen amount: 0.01 $cm^3/cm^3$ (in terms of STP) at 70° C. for 2 hours, and then filtered, washed and dried. A Pt—Co alloy catalyst was obtained by the above steps (loading ratio of catalyst metal: 50%).

The Pt—Co catalyst of Example 2 was subjected to composition analysis based on weight analysis and fluorescent X-ray analysis. In the weight analysis, 50 mg of the catalyst was weighed, and heated in air to burn and remove the carbon carrier, the remaining Pt metal component and Co metal component were reduced with hydrogen, and the weights of the reduced products were then measured to calculate the content of metal components in the catalyst. In the fluorescent X-ray analysis, the amount of Co (mass %) in the Pt—Co catalyst was analyzed. Thus, the amount of Co (mass %) determined in the fluorescent X-ray analysis was subtracted from the PtCo metal component amount obtained in the weight analysis to calculate the Pt amount (mass %). The result showed that the composition of catalyst particles of Example 2 was Pt:Co=about 1:0.33. The average particle size of catalyst particles was 4.5 nm.

Example 3 (Pt—Co—Mn Alloy Catalyst)

A Pt—Co—Mn alloy catalyst was manufactured by supporting Co and Mn on the Pt catalyst precursor of Example 1 to form an alloy, and then treating the alloy with a fluorine compound to form a water-repellent layer.

[Supporting of Co and Mn]

The Pt catalyst as a precursor was immersed in a metal salt solution obtained by dissolving 1.6 g of cobalt chloride ($CoCl_2 \cdot 6H_2O$) and 0.8 g of manganese chloride ($MnCl_2 \cdot 4H_2O$) in 100 mL of ion-exchange water, and was stirred with a magnetic stirrer. To this solution was added dropwise 500 mL of a sodium borohydride (SBH) solution having a concentration of 1% by mass, the mixture was stirred, and subjected to reduction treatment, and Co and Mn were supported on the Pt catalyst. Thereafter, filtration, washing and drying were performed.

The Pt catalyst in which Co and Mn were supported was subjected to heat treatment for alloy formation under the same conditions as in Example 2. Further, oxidizing solution treatment was performed under the same conditions as in Example 2.

[Formation of Water-Repellent Layer]

The Pt—Co—Mn ternary catalyst manufactured as described above was treated with a fluoro-compound solution to form a water-repellent layer. In this embodiment, a commercially available fluororesin material (trade name: EGC-1700 manufactured by Sumitomo 3M Limited, fluororesin content: 1 to 3%) was used as the fluorine compound. As a solvent, hydrofluoroether as a commercially available solvent (trade name: Novec7100 manufactured by Sumitomo 3M Limited).

In water repellency imparting treatment, first, 5 g of the catalyst was immersed in 100 mL of the solvent, and the resulting dispersion liquid was stirred at room temperature for 1 hour. A fluoro-compound solution obtained by dissolving 20 mL of the fluorine compound in 200 mL of a solvent was added dropwise to the dispersion liquid after stirring. After the fluoro-compound solution was added dropwise, the mixed solution was heated to 60° C., and stirred at this temperature for 1 hour. Thereafter, the solution was held at 60° C. in a dryer to evaporate the solvent completely. Through this treatment, a catalyst which had a water-repellent layer with a fluorine compound supported on the catalyst was manufactured. The supporting amount of the fluorine compound in the catalyst was 8.6 mass % based on the total mass of the catalyst.

The Pt—Co—Mn ternary catalyst of Example 3 was subjected to composition analysis in the same manner as in Example 2, and the result showed that the composition of the Pt alloy was Pt:Co:Mn=1:0.33:0.07. The average particle size of catalyst particles was 3.3 nm.

Comparative Example 1 (Pt Catalyst)

Here, a Pt catalyst to be compared with Example 1 was manufactured. In Example 1, a carbon fine powder carrier was introduced into a dinitrodiammine platinum nitric acid solution, and the mixture was stirred to prepare a slurry without pulverizing treatment. Reduction treatment was performed in the same manner as in Example 1 to form a platinum catalyst without performing heat treatment. The supporting density in the Pt catalyst was 50%, and the average particle size of the catalyst particles was 2.5 nm.

Comparative Example 2 (Pt—Co—Mn Alloy Catalyst)

Next, a Pt—Co—Mn ternary catalyst to be compared with Example 3 was manufactured. In the same manner as in Example 3, Co and Mn were supported on the Pt catalyst, heat treatment and oxidizing solution treatment were performed, and water repellency imparting treatment was performed.

In the water repellency imparting treatment in Comparative Example 2, a fluoro-compound solution was prepared from 20 mL of the same fluorine compound as in Example 3 and 200 mL of a solvent, and 5 g of the catalyst was immersed in this solution, immediately heated to 60° C., and stirred for 1 hour. Thereafter, the solvent was removed at 60° C. in a dryer to manufacture a catalyst. The composition of the Pt alloy of the catalyst of Comparative Example 2 was Pt:Co:Mn=1:0.33:0.07. The average particle size of catalyst particles was 3.3 nm.

[Evaluation of Dynamic Characteristics (Potential Holding Treatment—XPS Analysis)]

Physical properties for the state of Pt on the surfaces of catalyst particles after potential holding treatment were evaluated for the catalysts of Examples 1 to 3 and Comparative Examples 1 and 2. The potential holding treatment and XPS analysis were performed with a compounding apparatus as shown in the FIGURE. The compounding apparatus of the FIGURE has a structure in which a potential holding treatment chamber for the catalyst sample is connected to an XPS analysis chamber through an intermediate chamber. First, the catalyst sample adjusted in advance is subjected to potential holding treatment in a potential holding treatment chamber. In the potential holding chamber, the catalyst sample is held at a predetermined potential while a degassed 0.1 M perchloric acid solution is supplied to the surface of the catalyst sample. The catalyst sample after potential holding treatment is transferred into a vacuum analysis chamber through an evacuated intermediate chamber, and analyzed with an XPS analysis apparatus.

In this embodiment, potential holding treatment was performed with a 0.1 M perchloric acid solution. The catalyst sample was subjected to analysis after potential holding with the potential set to 1.2 V (vs. RHE) (counter electrode:platinum electrode) and the potential holding time set to 10 minutes. The XPS analysis was performed with a monochromatic Al-Kα ray (1486.6 eV) as an X-ray source and a power of 300 W over a measurement range of 2 mm×0.8 mm. In this analysis, generated photoelectric energy was detected to acquire a wide-area photoelectron spectrum (wide spectrum).

For calculating the ratio of zero-valent Pt on the surfaces of catalyst particles after potential holding, the data of the Pt4f spectrum obtained by XPS was analyzed by use of software (MultiPak) manufactured by ULVAC-PHI, Inc. In this analysis, "Pt" was associated with three chemical states (zero-valent Pt (0), divalent Pt (II) and tetravalent Pt (IV)). The main peak positions for the states were set at 71.6 eV for zero-valent Pt (0), 74.0 eV for divalent Pt (II) and 75.2 eV for tetravalent Pt (IV), and separation of peaks in the Pt4f spectrum measured by the software was performed. After the separation of peaks was performed, the ratio of each Pt was calculated from the area ratio of the peak for each state.

Next, catalyst properties were evaluated for each catalyst. In this embodiment, initial activity was measured, and the activity of the catalyst degraded by a potential cycle test was measured to evaluate durability.

[Initial Activity Test]

The catalysts of examples and the comparative example were subjected to an initial activity test. This performance test was conducted by measuring the mass activity. In the experiment, a single cell was used, and a membrane electrode assembly (MEA) obtained by sandwiching a proton conductive polymer electrolyte membrane between cathode and anode electrodes having an electrode area of 25 cm$^2$ (5 cm×5 cm) was prepared, and evaluated (set utilization efficiency: 40%). As pretreatment, a current-voltage curve was prepared under the conditions of a hydrogen flow rate of 1000 mL/min, an oxygen flow rate of 1000 mL/min, a cell temperature of 80° C., an anode humidified temperature of 90° C. and a cathode humidified temperature of 30° C. Thereafter, the mass activity was measured as main measurement. In the test method, a current value (A) was measured at 0.9 V, a current value (Ng-Pt) per 1 g of Pt was determined from the weight of Pt applied onto an electrode, and the mass activity was calculated.

[Durability Test]

Further, each catalyst was subjected to a durability test (degradation test) for evaluating durability. The durability test was conducted by subjecting the membrane electrode assembly (MEA) after the initial activity test to a potential cycle test. In the potential cycle test, sweeping was performed between 650 mV and 1050 mV at a sweeping speed of 40 mV/s for 20 hours (3600 cycles) to pretreat the catalyst. Thereafter, the catalyst was subjected to main treatment in which sweeping was performed between 650 mV and 1050 mV at a sweeping speed of 100 mV/s. This main treatment was performed for 24 hours (10800 cycles), and sweeping was further performed for 24 hours (21600 cycles) to degrade the catalyst. For the degraded catalyst (after 21600 cycles), mass activity was measured.

Table 1 shows the results of the property evaluation, the initial activity test and the durability test.

TABLE 1

| | Catalyst particles | Water-repellent layer | Ratio of each Pt after potential holding at 1.2 V (%) | | | | Mass Activity (A/g-Pt at 0.9 V) | | |
|---|---|---|---|---|---|---|---|---|---|
| | | | Zero-valent Pt (Pt$^0$) | PtO$_{ad}$ PtOH$_{ad}$ | Divalent Pt (Pt$^{2+}$) | Tetravalent Pt (Pt$^{4+}$) | Initial activity*[1] | After durability test*[1] | Maintenance ratio*[2] |
| Example 1 | Pt | — | 85.2 | 8.5 | 3.3 | 3.0 | 1.00 | 0.60 | 60.0% |
| Example 2 | Pt-Co | — | 85.0 | 8.4 | 5.3 | 1.3 | 1.65 | 0.80 | 48.5% |
| Example 3 | Pt-Co-Mn | Present | 81.1 | 12.0 | 6.0 | 0.9 | 1.95 | 1.10 | 56.4% |
| Comparative Example 1 | Pt | — | 67.0 | 13.0 | 12.0 | 8.0 | 0.95 | 0.40 | 42.1% |
| Comparative Example 2 | Pt-Co-Mn | Present | 74.3 | 14.3 | 9.9 | 1.5 | 1.90 | 0.50 | 26.3% |

*[1]Relative value against initial activity value in Example 1 which is defined as "1.0"

*[2](activity after durability test)/(initial activity)

The effect of defining the state of the surfaces of catalyst particles (ratio of zero-valent Pt) after potential holding treatment as examined in this embodiment can be determined by comparison of catalysts having basically the same composition. In this respect, from comparison between Example 1 and Comparative Example 1 each using a Pt catalyst and comparison between Example 3 and Comparative Example 2 each using a Pt—Co—Mn ternary catalyst, it can be confirmed that a catalyst in which the ratio of zero-valent Pt after potential holding treatment is 75% or more has high activity maintenance ratio after the durability test, leading to improvement of durability. Comparison between Example 3 and Comparative Example 2 indicates that even catalysts of the same composition have different ratios of zero-valent Pt after potential holding treatment depending on whether water repellency imparting treatment is optimized. In addition, the result of comparison of the example to the comparative example indicates that setting the ratio of zero-valent Pt after potential holding treatment to 75% has little initial-activity improving action.

With regard to initial activity alone, the Pt alloys (Pt—Co of Example 2 and Pt—Co—Mn of Example 3) have higher activity over the Pt catalyst of Example 1. However, the Pt catalyst does not have so high initial activity, but has a relatively high activity maintenance ratio after the durability test even in Comparative Example 1. That is, the Pt catalyst can be considered to intrinsically have high durability.

The technical significance of definition by the state of the surfaces catalyst particles after electrolysis treatment, which is the main subject of the present invention, is associated with a Pt alloy catalyst, particularly a ternary alloy catalyst such as a Pt—Co—Mn catalyst. The Pt—Co—Mn catalyst of Comparative Example 2 has high initial activity, but has an extremely low activity maintenance ratio after the durability test (26.3%). This means that the Pt—Co—Mn catalyst tends to have low durability. For the Pt—Co—Mn catalyst, the activity maintenance ratio becomes 56.4% or more when the ratio of zero-valent Pt after potential holding treatment is increased (Example 3). The catalyst of Example 3 has the highest initial activity and the highest activity after the durability test. Thus, it is apparent that both initial activity and durability can be made suitable by setting the composition of catalyst particles and the water-repellent layer, and optimizing the surface state hardly recognizable directly from these conditions.

INDUSTRIAL APPLICABILITY

The present invention enables the durability of an electrode catalyst for solid polymer fuel cells to be improved while maintaining good initial activity. The present invention contributes to popularization of fuel cells, and hence provides a foundation for environmental problem solution.

The invention claimed is:

1. A catalyst for solid polymer fuel cells comprising (A) catalyst particles comprising (a) a carbon powder carrier; and (b) Pt as a catalyst metal supported on the carbon powder carrier; and
   (B) a fluorine compound having a C—F bond is supported on at least surfaces of the catalyst particles, and a supporting amount of the fluorine compound is 3 to 20 mass % based on a total mass of the catalyst,
   wherein when the catalyst for solid polymer fuel cells is analyzed by X-ray photoelectron spectroscopy analysis after potential holding at 1.2 V (vs. RHE) for 10 minutes in a perchloric acid solution, a ratio of zero-valent Pt to total Pt as measured by the analysis is 75% or more and 95% or less.

2. The catalyst for solid polymer fuel cells according to claim 1, wherein the ratio of tetravalent Pt to total Pt is 1.5% or less as measured by the analysis.

3. The catalyst for solid polymer fuel cells according to claim 1, wherein the catalyst particles comprise Pt and metal M1 as catalyst metals, and the metal M1 is one of Co, Ni and Fe.

4. The catalyst for solid polymer fuel cells according to claim 3, wherein the catalyst particles comprise Pt, metal M1 and metal M2 as catalyst metals, and the metal M2 is one of Ni, Fe, Mn, Ti, Zr and Sn.

5. The catalyst for solid polymer fuel cells according to claim 1, wherein the fluorine compound is a fluororesin or a fluorine-based surfactant.

6. The catalyst for solid polymer fuel cells according to claim 1, wherein a supporting density of the catalyst particles is 30 to 70%.

7. A method for selecting a catalyst which is manufactured by any method and which is used for an electrode of a solid polymer fuel cell, comprising the steps of:
   subjecting the catalyst to potential holding treatment for 10 minutes at a constant potential of 1.2 V (vs. RHE) in a perchloric acid solution;
   analyzing the catalyst after the potential holding treatment by X-ray photoelectron spectroscopy analysis to measure a Pt spectrum of surfaces of catalyst particles of the catalyst; and
   calculating a ratio of zero-valent Pt to total Pt by the analysis, and it is determined that the catalyst is suitable for use when the ratio is 75% or more,
   wherein an electrochemical control apparatus for the treatment of the catalyst at the constant potential and an analysis chamber of an XPS apparatus for performing the X-ray photoelectron spectroscopic analysis communicate with each other in a vacuum state, and
   the X-ray photoelectron spectroscopic analysis is performed after the catalyst that has been subjected to the treatment at the constant potential is adapted not to come into contact with oxygen.

8. The catalyst for solid polymer fuel cells according to claim 2, wherein the catalyst particles comprise Pt and metal M1 as catalyst metals, and the metal M1 is one of Co, Ni and Fe.

9. The catalyst for solid polymer fuel cells according to claim 2, wherein a supporting density of the catalyst particles is 30 to 70%.

10. The catalyst for solid polymer fuel cells according to claim 3, wherein a supporting density of the catalyst particles is 30 to 70%.

11. The catalyst for solid polymer fuel cells according to claim 4, wherein a supporting density of the catalyst particles is 30 to 70%.

12. The catalyst for solid polymer fuel cells according to claim 1, wherein a supporting density of the catalyst particles is 30 to 70%.

13. The catalyst for solid polymer fuel cells according to claim 5, wherein a supporting density of the catalyst particles is 30 to 70%.

* * * * *